Dec. 8, 1964     T. PEDERZANI ETAL     3,160,881
METHOD OF SIMULTANEOUSLY DISPLAYING AT LEAST TWO
PICTURES ON THE SCREEN OF A CATHODE-RAY TUBE
Filed May 13, 1958     2 Sheets-Sheet 1
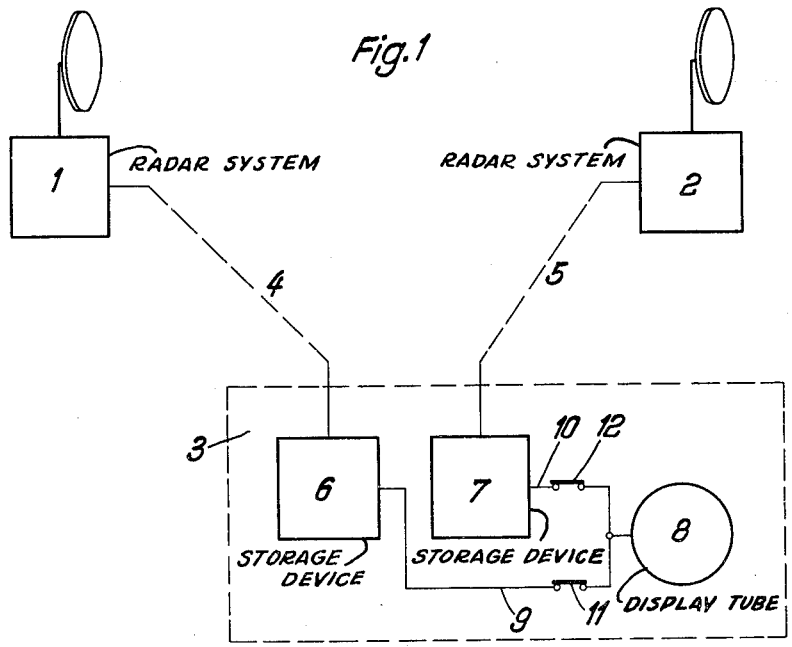
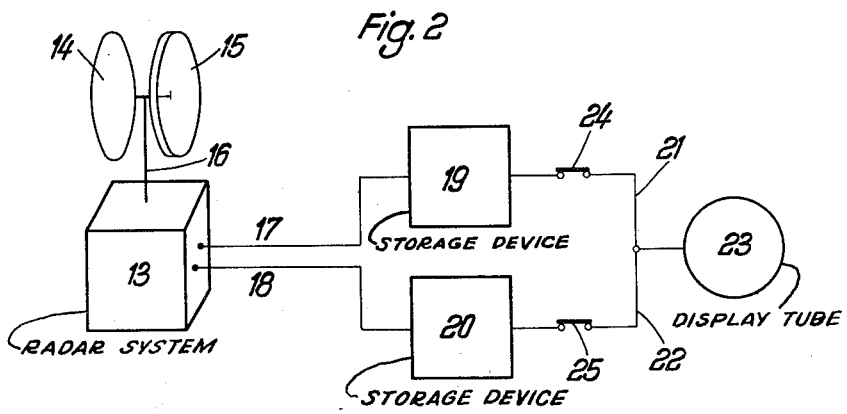
Inventor:
THEODOR PEDERZANI
HANS STUVE
By Eric D. Frankel
Patent Agent INVENTORS
Theodor Pederzani &
Hans Stüve
BY Spencer & Kaye
ATTORNEYS 3,160,881
METHOD OF SIMULTANEOUSLY DISPLAYING AT LEAST TWO PICTURES ON THE SCREEN OF A CATHODE-RAY TUBE
Theodor Pederzani and Hans Stüve, Ulm (Danube), Germany, assignors to Telefunken Aktiengesellschaft
Filed May 13, 1958, Ser. No. 734,945
Claims priority, application Germany May 15, 1957
1 Claim. (Cl. 343—17.1)

This invention relates to a method of displaying at least two pictures at the same time on the screen of a cathode-ray tube, more particularly for use in radar apparatus.

It is known to make several pictures displayed on cathode-ray tubes appear on a common picture screen by using optical means. In such arrangements light rays are always deflected by semitransparent mirrors, which have the property of deflecting the incoming light partly in the desired direction and partly in a direction where no radiation is required. Due to the use of semitransparent mirrors, a considerable amount of light intensity is lost with the result that pictures displayed by such conventional arrangements are very dim. Furthermore, in order to obtain a distortion-free picture it is necessary to provide a mechanically rigid display equipment. Also, separate electrical means such a cathode-ray tube must be provided for every picture to be superimposed, and these means plus the necessary optical means involve considerable expenses.

To obviate the aforementioned disadvantages, there has been proposed an arrangement for superimposing a plurality of circular radar displays on the screen of a single cathode-ray tube. According to this proposal, an electronic storage line is provided for each picture to be superimposed, the signals which a radar apparatus receives as a train of echos from a transmitted signal which is usually displayed on a circular radar presentation, being recorded on said storage line. The stored signals are then scanned once and in so rapid a manner, that there is a time interval before the next train of echos representing the same picture will be scanned. During this interval, signals from other stored trains of echos comprising the picture signal outputs of other radar apparatus are scanned and fed to the control electrode of the common cathode-ray tube. As radar antennas are generally caused to rotate relatively slowly, say 5 revolutions per minute, the screen of the common cathode-ray tube must have a persistency at least as great as the time for completion of one scanning cycle of the antenna and, therefore, one writing cycle of the electron beam. When displaying several radar pictures simultaneously, it is often desirable to switch off some of the radar systems for a short time for the purpose of determining from which system particular elements of the picture come. It is especially desirable to switch off some systems when the systems operate in different frequency ranges and one of them is being disturbed by a jamming transmitter. However, with such a proposed method, suppression of some of the displays is not possible within the short time allowed, since as already said above the screen of the cathode-ray tube must have a long persistency.

The object of the invention is to provide a simultaneous display of a plurality of pictures on a common cathode-ray tube whereby brightness losses such as occur in prior art optical superposition methods and wherein constructional difficulties involved are overcome while, as opposed to the above-mentioned proposed method based on an electrical picture superposition, quick switching off of some of the signal displays is made possible.

According to the present invention, there is provided a method of simultaneously displaying at least two pictures, more particularly circular pictures from (PPI) radar apparatus, on the screen of a common cathode-ray tube, whereby trains of echos modulated by the picture contents are fed to respective storage-devices in such a manner that at any time there is a whole picture stored in the storage-device. The device is then scanned repeatedly in predetermined time intervals and fed directly to the control electrode of a cathode-ray tube with short persistency while said storage-devices are scanned so rapidly that between the scanning periods of any individual storage-device, time intervals occur during which the other storage-devices are scanned and the signals thus picked up are fed to said cathode-ray tube.

Other objects, features and advantages of this invention will appear from the following description taken in connection with the accompanying drawings, where FIGURE 1 shows an embodiment according to the invention;

FIGURE 2 shows a modified embodiment of the invention.

Figure 3:
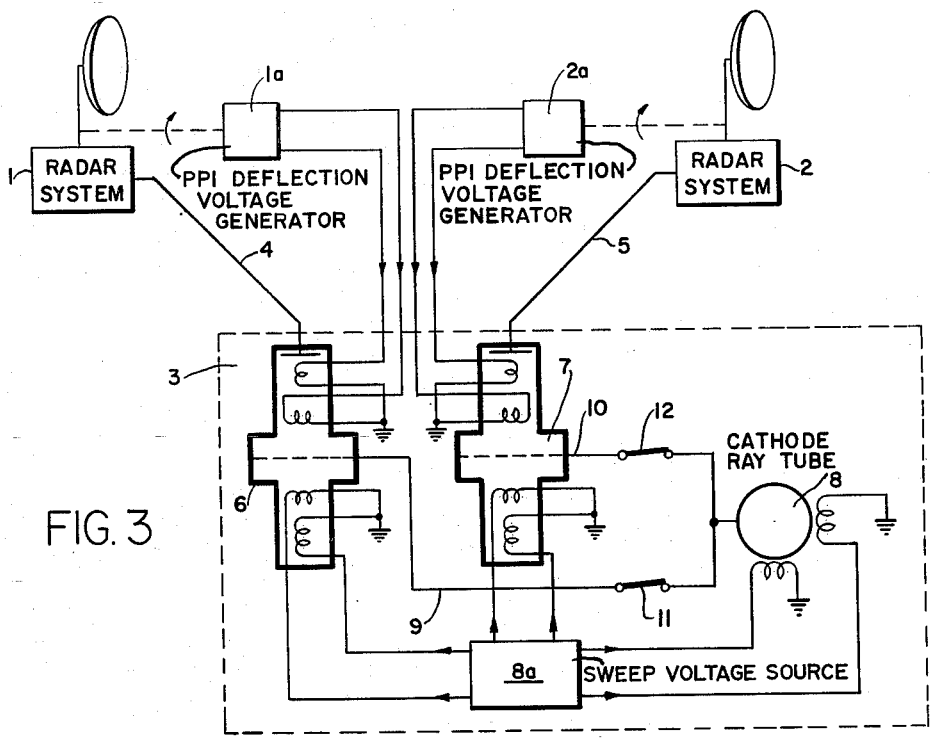
FIGURE 3 is a more detailed schematic diagram of the embodiment shown in FIGURE 1.

FIGURE 1 illustrates the application of the method according to the invention to the simultaneous display of two pictures from two remote radar systems. 1 and 2 denote two radar systems widely spaced from each other. It will be assumed that the distance between both systems is such that their viewing fields overlap partly or are contiguous. If the viewing fields of both radar apparatus overlap, it is necessary that the apparatus operate on different frequencies to exclude any reciprocal interference. In the embodiment shown, it is assumed that the display equipment within the dotted rectangle 3 is arranged in a monitoring station remote from the two radar apparatus and connected thereto via information channels 4 and 5. The information channels 4 and 5 may be constructed as usual electric transmission lines. When the distance between the station and the radar systems 1 and 2 is very great, it is advisable to provide a conventional band width compression prior to transmission and to transmit to the station via low quality paths such as telephone lines. Obviously, it is also possible to connect the display equipment 3 adjacent spatially to one radar system. The picture output signals from the radar systems 1 and 2 are fed to the storage-devices 6, 7 via the lines 4 and 5 respectively. Said storage-devices are preferably storage-tubes of the type which can be written on and scanned at the same time. The targets of these storage-tubes are of such a construction as to allow for repeated scanning of the stored signals. In FIGURE 3, each of the antennas is mechanically coupled with a generator 1a and 2a, respectively, which produce PPI deflection voltages corresponding with the position of the associated antenna. There is also provided a sweep voltage source 8a which simultaneously scans the cathode ray tube 8, and both of the storage tubes 6 and 7. Storage-tubes of this type are known for example under the name of "Graphechon" and used as line converters in television and also to convert radar pictures by using saw-tooth sweeps to form rapid successive television pictures to be displayed on a long-persistency cathode-ray tube. Any storage-device can be used provided its storage capacity is such that a whole picture can be stored therein and can be scanned so rapidly as to give rise to a composite picture in a television-like display process. The pictures stored in the storage-devices 6 and 7, which contain the deflection means for the display tube 8, are successively scanned at a rapid rate, say 25 times per second. The scanning process must be performed so rapidly that between the individual scanning periods there occur long enough time intervals so that the other storage-devices can be scanned. In the embodiment shown, if the storage-devices 6 and 7 were built up as surface storage-devices, they would be written on continuously exactly like the display tubes of radar apparatus. Each scanning process for each storage device occurs at a substantially faster rate but includes intervening stop intervals so that both storage-devices 6 and 7 can be scanned alternately. This alternate scanning is necessary, since the common display tube 8 has one electron beam only for display purpose, the intensity of said electron beam being controlled by the signals from both radar storage devices successively. For scanning the storage-devices a saw-tooth deflection can be used and of course, the electron beam of the display tube is then also deflected by a saw-tooth sweep. However scanning in the storage-devices and the display tube may also be achieved through line deflection, such as used in television. If storage-devices 6 and 7 include separate storage lines which are written on continuously, they obviously must also be scanned along the same lines in step with the electron beam of the display tube 8 and deflected by the same saw-tooth wave. Output voltages from the storage-devices 6 and 7 are fed to the brightness control electrode of the display tube 8 via the lines 9 and 10. In order to obtain a continuous and faithful picture of the area scanned by the radar systems 1 and 2 it is necessary to apply to the deflecting systems of the display tube 8 adidtional D.C. phasing voltages the values of which correspond to the spacings between the physical locations of the radar systems and which are effective only during the scanning of the associated storage-device. Obviously, a plurality of discontinuous pictures can be produced on the display screen as a result of the application of D.C. voltages to the deflecting electrodes. The fluorescent screen of the display tube 8 has little persistency. For this reason the above-mentioned scanning rate of 25 picture lines per second is necessary to yield a picture which appears continuous to the human eye. Switches 11 and 12, normally closed, are inserted in the lines 9 and 10. By opening either of said switches the information from the corresponding radar system which was displayed on tube 8 is turned off immediately.

As a result of repeated scanning of every stored picture the band width of the output signal becomes of course substantially larger than that of the train of echoes fed to the storage-device input. In the present case however this band widening is not troublesome, since no further transmission is preferred after storage but the signals are fed to the display tube directly.

Instead of two radar systems, any number of radar systems can be used, all the information being combined on one cathode-ray tube. Instead of combining two or more circular radar displays, it is also possible to introduce any other information such as maps, distance circles or angle sectors, into a radar display.

Figure 4:
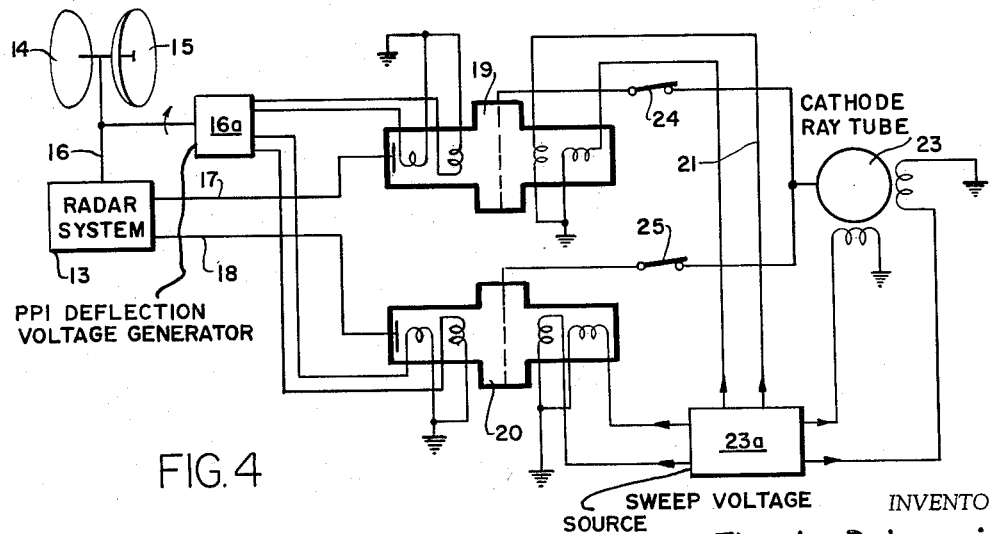
FIGURE 4 is a more detailed schematic diagram of the embodiment shown in FIGURE 2.

In FIG. 2 there is shown an arrangement embodying the method according to the invention to combine the various displays of a radar system with the provision of a plurality of antennas diversely directed and arranged on a common rotating shaft, and the system having a corresponding number of radar receivers. Radar systems comprising a plurality of directional antennas arranged on a common rotating shaft, more particularly two back-to-back directional antennas, are already known. They have the advantage that the signals per rotating cycle of the antenna are considerably increased, as compared with conventional radar systems. It has been found particularly advantageous to associate the antennas not only with different receivers but also with different transmitters, so that each antenna can operate on another frequency, an auxiliary frequency being thus available at any time, should jamming transmitters interfere with the operation. In the embodiment illustrated in FIG. 2 the radar system is denoted by 13, and its two back-to-back directional antennas by 14 and 15. Both antennas 14 and 15 are rotated about the shaft 16. Via the lines 17 and 18 the picture signal outputs of the two receivers in the radar system 13 are connected to the inputs of two storage-devices 19 and 20. FIGURE 4 shows a more detailed schematic diagram of a workable system wherein parts bear reference characters similar to those of FIGURE 2. In FIGURE 4, the antenna shaft 16 also turns a PPI deflection generator 16a which associates the position of the antennas with the position of the echoes on the cathode ray tube screen. In addition, a sweep voltage source 23a simultaneously scans the storage tubes 19 and 20 and the cathode ray tube 23. The writing and scanning processes for the picture signals are performed in the same manner as in the storage-devices 6 and 7 of the embodiment of FIG. 1. Output signals from the storage-devices 19 and 20 are fed to the intensity control electrode of a cathode-ray tube 23 via the lines 21 and 22. As opposed to the arrangement previously described with reference to FIGURE 1, wherein the displays of two remote radar systems are combined, no D.C. voltage for shifting the various displays is required in the arrangement according to FIG. 2, since the radar antennas which pick up the echo signals are mounted on the same spot. Two switches 24 and 25 are provided in the lines 21 and 22 and can be used to switch off any receiver disturbed by a jamming station, for example, by opening the corresponding switch.

We claim:

The method of combining on a single short-persistency screen a composite presentation representing trains of echo signals from at least two continuously operating pulse-echo radar systems including antennas which are rotated in back-to-back relation at a common location, including the steps of separately and continuously recording the trains of received pulses from each radar system; retaining the separate records long enough for each to represent at least one complete radar scanning cycle from each associated radar system; reproducing in rapid succession the various complete recorded scanning cycles; displaying the successively produced echo signals in superimposed relationship on said screen at a high enough rate that the successively displayed scanning cycles appear to the human observer to form a composite presentation; and applying the signal trains from both systems to said screen to provide an increased amount of information per cycle of antenna rotation.

References Cited in the file of this patent
UNITED STATES PATENTS

| | | |
|---|---|---|
| 2,549,072 | Epstein | Apr. 17, 1951 |
| 2,586,743 | Thresher et al. | Feb. 19, 1952 |
| 2,702,356 | Flory | Feb. 15, 1955 |
| 2,716,203 | Sen et al. | Aug. 23, 1955 |
| 2,822,536 | Sandretto | Feb. 4, 1958 |
| 2,972,141 | Barlow et al. | Feb. 14, 1961 |